(12) United States Patent
Tanimura et al.

(10) Patent No.: US 6,791,824 B2
(45) Date of Patent: Sep. 14, 2004

(54) TAPE RUNNING APPARATUS, MOTOR BOARD, AND CAPSTAN MOTOR

(75) Inventors: Satoshi Tanimura, Nagano (JP); Hayato Naito, Nagano (JP); Izumi Komatsu, Nagano (JP); Nobuki Kokubo, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 10/170,347

(22) Filed: Jun. 14, 2002

(65) Prior Publication Data

US 2002/0191381 A1 Dec. 19, 2002

(30) Foreign Application Priority Data

Jun. 15, 2001 (JP) .................................... P2001-180916
Jun. 15, 2001 (JP) .................................... P2001-180917

(51) Int. Cl.[7] ............................................. H05K 7/02
(52) U.S. Cl. ...................... 361/679; 361/748; 361/760
(58) Field of Search ................................ 361/600, 679, 361/724, 728, 736, 743, 748, 760, 807, 820; 318/34

(56) References Cited

U.S. PATENT DOCUMENTS

| 3,566,005 | A | * | 2/1971 | Shaheen ..................... 174/262 |
| 3,628,095 | A | * | 12/1971 | Schwartz et al. ........... 361/775 |
| 4,394,711 | A | * | 7/1983 | Conley ....................... 361/776 |
| 5,461,520 | A | * | 10/1995 | Kobayashi et al. ........... 360/71 |
| 5,551,145 | A | * | 9/1996 | Jurgenson ................. 29/603.03 |
| 5,715,141 | A | * | 2/1998 | Karlsson ..................... 361/707 |
| 6,147,869 | A | * | 11/2000 | Furnival ..................... 361/719 |
| 6,337,550 | B1 | * | 1/2002 | Takahashi et al. .......... 318/483 |

* cited by examiner

*Primary Examiner*—Bentsu Ro
(74) *Attorney, Agent, or Firm*—Sughrue Mion, PLLC

(57) ABSTRACT

A motor board 44 of a capstan motor, which is made of a metallic material offering good heat dissipation is provided in a tape running apparatus 1 in such a way as to face a circuit board 6 thereof. A motor drive IC 43, into which drive circuits for driving and controlling a capstan motor 4, a drum motor 2 and a loading motor 3 is incorporated, are mounted on this motor board 44. The circuit board 6 and the motor board are connected to each other by an inter-board connector 7. Further, electrical connection between the circuit board 6 and each of the motors 2, 3, and 4 is established through the motor board 44.

6 Claims, 4 Drawing Sheets

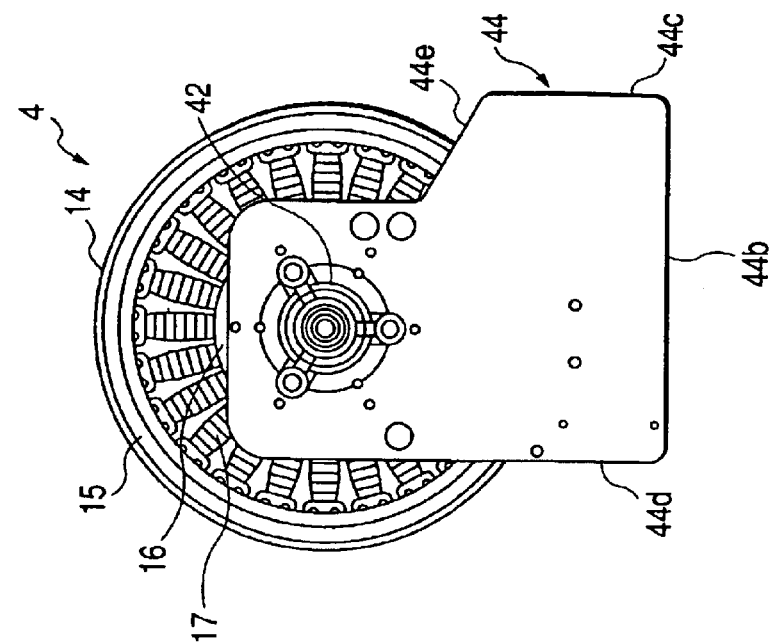
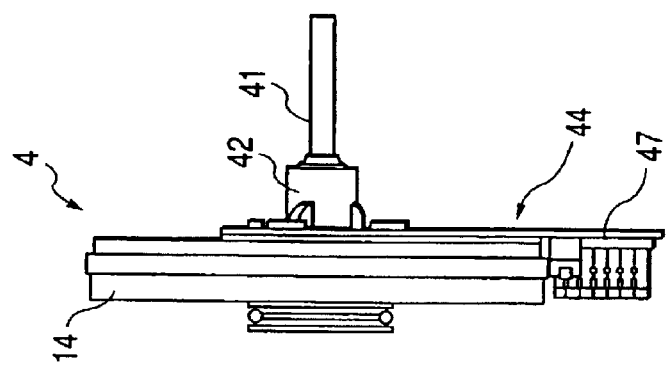
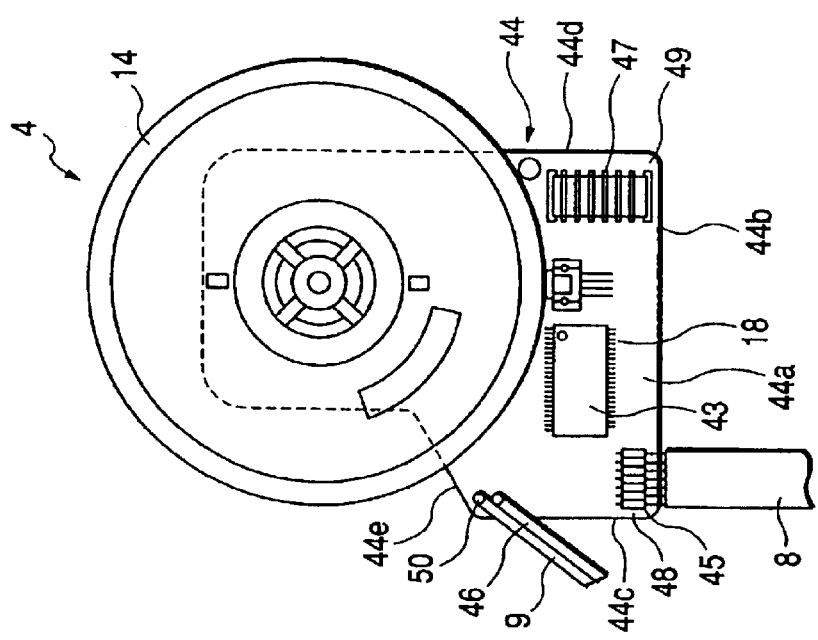

TAPE RUNNING APPARATUS, MOTOR BOARD, AND CAPSTAN MOTOR

The present application is based on Japanese Patent Applications No 2001-180916 and No. 2001-180917, which are incorporated herein by reference.

BACKGROUND OF THE INVENTION

1. Field of the Invention

The present invention relates to a tape running apparatus used for recording information on and reproducing information from magnetic tape, such as video cassette tape, and to a motor board of a motor for use in the tape running apparatus.

2. Related Art

As shown in FIG. 5, a tape running apparatus incorporated into a video cassette recorder (VCR) has a drum motor 102 for rotating a cylinder drum 101, which holds a magnetic head (not shown), a loading motor 103 for drawing out video cassette tape to the magnetic tape, and a capstan motor 104 for running video cassette tape at a constant speed. These motors 102, 103, and 104 are mounted on a common chassis 105, and supplied with driving power and drive control signals from a recorder-body-side circuit board 106.

Generally, motor driving ICs 107 and 108 used for driving the capstan motor 104 and the drum motor 102 are mounted on the motor boards 109 and 110, respectively. A motor driving IC 111 for driving the loading motor 103 is mounted on the circuit board 106.

The motor board 109 of the capstan motor 104 opposes to the circuit board 106. Thus, electrical connection is established between this motor board 109 and the circuit board 106 through a pair of inter-board connectors 112. On the other hand, the motor board 110 of the drum motor 102 does not oppose to the circuit board 106. Thus, electrical connection is established therebetween through a full flat cable 113. In this case, full-flat-cable connecting connectors 114 and 115 are mounted on the boards 110 and 116, respectively. Further, in the case of the loading motor 103 to be driven by using the motor drive IC 111 that is mounted on the circuit board 106, electrical connection is established between this loading motor 103 and the circuit board 106 through a lead wire 116 with a connector, which is drawn out of the loading motor 103. In this case, on the circuit board 106, a receiving side connector 117 for connecting the lead wire thereto is mounted. The connector 118 attached to the lead wire 116 is connected and fixed to this receiving side connector, However, such an ordinary tape running apparatus needs a pair of inter-board connectors 112, two connectors 114 and 115 for a full flat cable, a single full flat cable 113, a single lead wire 116 with a connector, and a single receiving-side connector 117 for connecting the lead wire 116 thereto so as to establish electrical connection between the circuit board and each of the three motors. Thus, such a conventional tape running apparatus has a problem in that the cost for establishing such the electrical connection is high. Moreover, the working voltages of individual motors often differ from one another. Thus, the conventional tape running apparatus has problems in that in such a case, the power cost thereof is expensive, and that the number of devices, such as capacitors, provided around the power supply increases.

To solve such problems, and to reduce the cost and size of the tape running apparatus, in recent years, there has been proposed motor drive ICs each of which is configured by incorporating drive circuits for two motors into a single motor drive IC. For examples, a motor drive IC, into which a motor a drive circuit for a capstan motor and a drive circuit for a loading motor are incorporated, and a motor drive IC, into which a motor a drive circuit for a drum motor and a drive circuit for a loading motor are incorporated, have been proposed.

Further, on a component mounting surface of the motor board, IC lands for soldering lead terminals of a motor drive IC thereonto, and wiring lands for wiring and connecting to external equipment are disposed. Generally, soldering of junction cables which is used for connecting the external equipment thereto to the wiring lands are conducted after the lead terminals of the motor drive IC are soldered to the IC lands.

The wiring cost for establishing electrical connection between the circuit board and each of the motors can be reduced by using such a motor drive IC. Moreover, the number of connectors can be decreased Consequently, such a motor drive IC is considered to be advantageous in downsizing of the tape running apparatus.

However, the amount of heat radiated from the motor drive IC is large, so that countermeasures against heat radiation are necessary. Thus, countermeasures, such as addition of silicone grease and that of a heat sink, are taken. Such countermeasures, however, are unfavorable because of the facts that the cost of the apparatus is increased for those, and that the countermeasures hinder reduction in size of the apparatus.

Further, such a motor drive IC is unfavorable because of the facts that when such a motor drive IC is mounted on the circuit board, the size of the circuit board is increased or the reduction in the size thereof becomes difficult, and that noises due to a switching operation performed in the motor drive IC are superposed on signals in other circuit portions, which are mounted on the circuit board, so that there is fear of adversely affecting picture signals and speech signals.

SUMMARY OF THE INVENTION

In view of such circumstances, an object of the invention is to propose a tape running apparatus enabled to establish electrical connection between a circuit board and each of three motors without increasing the cost of the apparatus, and hindering the reduction in size of the apparatus, and being adversely affected by motor noises.

Further, in the case that the wiring lands and the IC lands are disposed on the component mounting surface of the motor board in such a way as to oppose to each other, unnecessary solder may adhere to a part between the IC lands to which the lead terminals of the motor drive IC are soldered when the junction cable is soldered thereto. Thus, a solder bridge put in a state where a short-circuit is established between the IC lands is apt to be generated. Furthermore, there is possibility that a similar solder bridge is formed between the wiring lands and the IC lands.

It is sufficient for preventing solder bridge that the wiring lands are formed at a distance from the IC lands to which the motor drive IC is soldered. However, the motor board is required to have a limited size. In particular, the recent tendency is shifted to reduce the size of the apparatus. Thus, it is sometimes difficult to place the wiring lands at a sufficient distance from the IC lands. Furthermore, if the IC lands and the wiring lands are not properly disposed, there could be caused adverse effects that places for drawing junction cables to connect the external equipment are limited.

However, in the case of the conventional apparatus, no consideration is given to the placement relation between the wiring lands and these IC lands. Therefore, as matters stand, no proper placement of such lands has been proposed.

Accordingly, in order to adapt downsizing of the apparatus, another object of the invention is to provide a motor board, in which wiring lands are disposed at positions where solder bridge could not be formed among IC lands connected to lead terminals of a motor drive IC or between IC lands and wiring lands when externally connected wiring cables are soldered to the wiring lands, and, where the externally connected wiring cables can be properly drawn around.

To solve the aforementioned problems, according to the invention, there is provided a tape running apparatus having a circuit board, a drum motor, a loading motor and a capstan motor, wherein a motor board of the capstan motor opposes to the circuit board. Further, a motor drive IC into which a drive circuit for the capstan motor, a drive circuit for the drum motor and a drive circuit for the loading motor are incorporated is mounted on the motor board. Furthermore the motor board of the capstan relays electrical connections between the circuit board and two of the drum motor and the loading motor.

The Electrical connections may be established by using an inter-board connector for establishing electrical connection between the motor board and the circuit board, and a junction wire for establishing electrical connection between the motor board and each of the drum motor and the loading motor.

In this case, the junction wire may be a junction cable that comprises a circuit-board-side part connected to the circuit board, and branch parts branched from the circuit-board-side part and connected to the drum motor and the loading motor, respectively.

The tape running apparatus of the invention employs the motor drive IC, into which the drive circuits for the three motors are incorporated. Moreover, in this tape running apparatus, the motor drive IC is mounted on the motor board of the capstan motor, which opposes to the circuit board. Therefore, the electrical connections between the circuit board and the three motors can be established by using a pair of inter-board connectors and a junction wire. As compared with the conventional apparatus, the wiring cost of the apparatus can be reduced. Furthermore, the invention is advantageous in downsizing of the tape running apparatus.

Furthermore, because the motor drive IC is mounted on the motor board of the capstan motor, the invention prevents occurrences of adverse effects that motor noises intrude circuit parts mounted on the circuit board and adversely affect picture signals and speech signals.

Further, it is desirable that a metallic board providing good heat dissipation is employed as the motor board in the tape running apparatus of the invention. This eliminates the necessity for applying silicone grease onto and adding a heat sink to the motor drive IC as the countermeasures to radiate heat therefrom.

Furthermore, according to the invention, on a motor board having a board surface, on which IC lands, to which lead terminals of a motor drive IC are soldered, and wiring lands to be connected to externally connected wires are mounted, the wiring lands are placed at positions where the wiring lands do not oppose to the IC lands mounted on the board surface.

Because each of the IC lands does not oppose to the wiring lands, there is no fear that an unnecessary solder bridge is formed between the IC lands or between the wiring lands and the IC lands when externally connected wiring cables are soldered to the wiring lands.

It is desirable that the wiring lands are disposed on the corner part of the surface of the motor board. That is, preferably, in the case that the board surface has a surface region defined by a first side, and second and third sides respectively extended from both ends of this first side in a direction differing from a direction along which the first side extends, the wiring lands are placed on a first corner part, which is defined by the first side and the second side, or on a second corner part, which is defined by the first side and the third side, in this surface region.

Further, in the case that the wiring lands include at least a first wire land portion and a second wire land portion, it is sufficient that the first wire land portion is disposed on one of the first and second corner parts, while the second wire land portion is disposed on the other corner part.

Thus, one of two sides of the corner part can be selected as a direction in which the externally connected wire is drawn, Consequently, the flexibility in designing the layout of wiring to suitably draw the wire therearound is enhanced. Furthermore, when a jig for soldering the wire to the board is manufactured, the two sides of the motor board can be employed as a reference side. This facilitates the manufacturing of the jig.

Furthermore, in the case of using a video reproducing apparatus adapted to drive and control a plurality of motors as the reduction in size and thickness thereof has been achieved, it is preferable that the wiring lands, which are respectively connected to the motors, are placed on the corner parts, as described above, because of the fact that usually, no electronic components are disposed on corner parts of the motor board even when the number of components mounted on the board increases, and thus such parts can be effectively utilized.

Further, the invention relates to the motor board of the capstan motor of the tape running apparatus. On the surface of this motor board, the IC lands, to which lead terminals of the motor drive IC are soldered, and the wiring lands for connecting the externally connected wires thereto are formed. Furthermore, the wiring lands are disposed at positions where the wiring lands do not oppose to the IC lands. Further, the wiring lands include at least the first wire land portion and the second wire land portion. The first wire land portion is disposed on one of the first and second corner parts. The second wire land portion is disposed on the other corner part. Furthermore, the first wire land portion is used for connecting the wire to the drum motor. The second wire land portion is used for connecting the wire to the loading motor.

Furthermore, the invention relates to the capstan motor having the motor board of this configuration, This capstan motor has a motor drive IC mounted on the motor board. In this motor drive IC, a drive circuit for driving the drum motor, and a drive circuit for driving the loading motor are incorporated.

BRIEF DESCRIPTION OF THE DRAWINGS

FIGS. 2A, 2B, and 2C are a rear view, a side view, and a sectional view each illustrating a motor for a capstan of the tape running apparatus shown in FIG. 1, respectively;

DETAILED DESCRIPTION OF THE PREFERRED EMBODIMENTS

Hereinafter, an example of a tape running apparatus, to which the invention is applied, is described.

Figure 1:
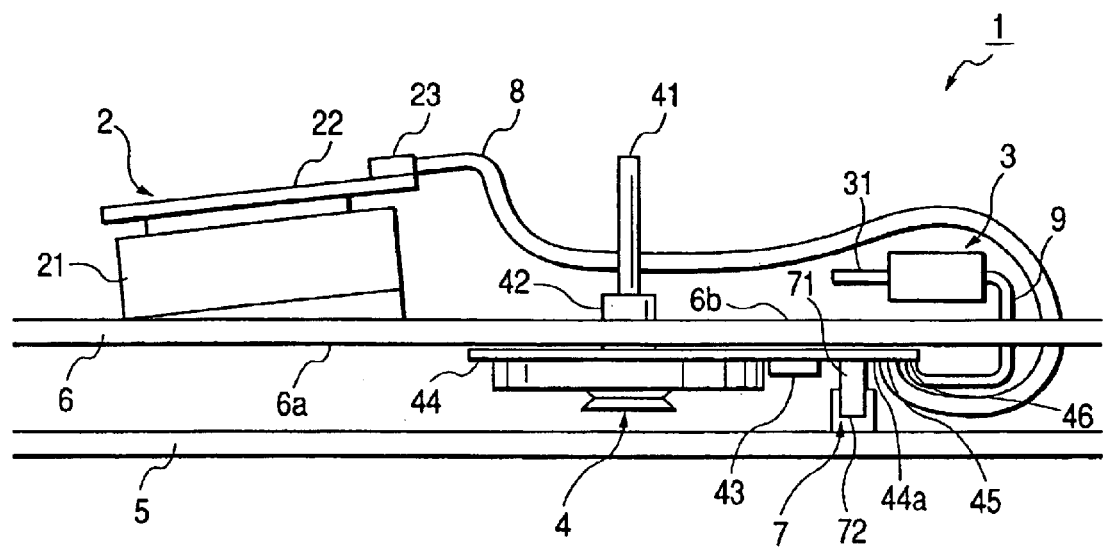
FIG. 1 is a schematic side view illustrating a primary part of a tape running apparatus to which the invention is applied.

FIG. 1 is a sectional view illustrating this example of a tape running apparatus to which the invention is applied. FIGS. 2A, 2B, and 2C are a rear view, a side view, and a plan view each illustrating a capstan motor of the tape running apparatus shown in FIG. 1.

As illustrated in these figures, the tape running apparatus 1 according to this embodiment is incorporated into a video cassette recorder, and has a drum motor 2 for rotating a cylinder drum 21, which holds a magnetic head (not shown), a loading motor 3 for drawing out video cassette tape to the magnetic tape, a capstan motor 4 for running video cassette tape at a constant speed, and a video-cassette-recorder-side circuit board 5 electrically connected to these motors 2, 3, and 4. These motors 2, 3, and 4 are supplied with driving current and drive control signals from the circuit board 5.

The motors 2, 3, and 4 are mounted on a chassis 6 placed at a certain distance from and in parallel to the circuit board 5. In this embodiment, the capstan motor 4 is mounted on the rear surface 6a, which faces the circuit board 5, of the chassis 6. The drum motor 2 and the loading motor 3 are mounted on the front surface b, which faces the circuit board 5, of the chassis 6.

The drum motor 2 mounted on the surface 6b of the chassis has the cylinder drum 21 and a motor board 22 of the drum motor disposed on the drum 21. Further, the loading motor 3 is disposed so that the rotation axis 31 thereof is parallel to the surface 6b of the chassis.

On the other hand, the capstan motor 4 mounted on the rear surface 6a of the chassis has a capstan shaft 41, a bearing 42 rotatably supported on the chassis 6, a motor board 44 of the capstan motor, which is made of a metallic material providing good heat dissipation, and a motor drive IC 43 mounted on this motor board 44. The capstan shaft 41 penetrates through the chassis 6 and erected on the front surface side thereof. The motor board 44 is disposed at a slight distance from the rear surface 6a of the chassis 6 in such a way as to extend therealong. A component mounting surface 44a of the motor board faces the circuit board 5. The motor drive IC 43 is a common motor drive IC. into which drive circuits respectively used for the motors 2. 3, and 4 are incorporated. Further, a disk-like outer rotor 14 is fixed to an end of the capstan shaft 41. An annular drive magnet 15 is attached thereto. Moreover, a stator 16 is attached to the side of the bearing 42. This stator 16 has a drive coil 17 wound around a plurality of salient poles radially disposed in such a way as to face the inner circumferential surface of the drive magnet 15.

In this embodiment, electrical connection between the circuit board 5 and each of the motors 2, 3, and 4 is established as follows. First, electrical connection between the motor board 44 of the capstan motor, on which the motor drive IC 43 is mounted, and the circuit board 5 is established by using an inter-board connector 7 consisting of a plug terminal 71 and a terminal receiving part 72 mounted on the surface of the circuit board 5.

Further, each of electrical connection between the drum motor 2, which is mounted on the surface 6a of the chassis 6, and the circuit board 5, and electrical connection between the loading motor 3 and the circuit board 5 is established through the motor board 44 of the capstan motor.

That is, a connector 23 for a full flat cable is mounted on the motor board 22 of the drum motor 2. An end of the full flat cable 8 is connected to the connector 23. The other end of this full flat cable 8 is soldered to first wire land portion 45 formed on the component mounting surface 44a of the motor board 44 of the capstan motor. Further, a lead wire 9 is drawn out of the loading motor 3. An end of this lead wire 9 is soldered to a third wire land portion 46 formed on the component mounting surface 44a of the motor board 44 of the capstan motor.

Furthermore, a second wire land portion 47 is placed on the component mounting surface 44a of the motor board 44 of the capstan motor (see FIGS. 2A to 2C). These second wire land portion 47 is connected to the first wire land portion 45, and the third wire land portion 46 through a wiring pattern formed on the motor board 44. Similarly, the second wire land portion 47 is connected to the motor drive IC 43 through a wiring pattern formed on the motor board 44. The plug terminal 71 of the aforementioned inter-board connector 7 is soldered to the second wire land portion 47.

In the tape running apparatus 1 according to this embodiment, which is configured in the above manner, the motor board 44 of the capstan motor is connected to the circuit board 5 by using the inter-board connector 7. Moreover, the full flat cable 8 and the lead wire 9 are connected to each other, as described above. Thus, electrical connection between the circuit board 5 and each of the motors 2, 3, and 4 is established through the motor board 44. That is, a path from the circuit board 5 to the motor drive IC through the inter-board connector 7 is formed. Further, a path from the circuit board 5 to the drum motor 2 through the inter-board connector 7 and the full flat cable 8 is formed. Furthermore, a path from the circuit board 5 to the loading motor 3 through the inter-board connector 7 and the lead wire 9 is formed. Simultaneously, electrical connection between the motor drive IC 43 and each of the motors 2 and 3 is established.

In the tape running apparatus 1 configured in this manner, electrical connection between the circuit board 5 and each of the motors 2, 3, and 4 is established by using only the single inter-board connector 7 formed between the circuit board 5 and the motor board 44 of the capstan motor, the single full flat cable 8, the single connector 23 for the full flat cable, and the single lead wire 9. Therefore, the connection therebetween can be established at low cost in a manner in which a necessary space is small.

Further, the motor drive IC 43 is mounted on the motor board 44 of the capstan motor, so that the motor drive IC 43 can be dependent of the circuit part mounted on the circuit board 5. Therefore, the invention can prevent motor noises from intruding the circuit part provided at the side of the circuit board 5 and adversely affecting picture signals and speech signals.

Furthermore, the motor board 44, on which the motor drive IC 43 serving as a heating source for generating heat is mounted, is formed from a metallic material offering good heat dissipation. Moreover, the motor board 44 is placed close to the chassis 6. Therefore, heat generated by the motor drive IC 43 can be efficiently radiated through the motor board 44 and the chassis 6.

Further, as illustrated in FIGS. 2A to 2C, the motor board 44 has a shape which is formed by removing a trapezoid from a rectangle at one of corners thereof. The bearing 42 is attached to the center of a narrow-side part thereof. The contour of a wide-side part thereof is defined by a first side 44b, second and third sides 44c and 44d respectively extending from both sides of this first side 44b in a direction perpendicular thereto, and a fourth side 44e extending from the other end of the second side 44c at an angle that is larger than 90 degrees. A right-angled first corner part 48 is defined by the first and second sides. Similarly, a right-angled second corner part 49 is defined by the first and third sides. An obtuse third corner part 50 is defined by the second and the fourth sides.

A surface of the motor board 44 having such a shape serves as the component mounting surface 44a for mounting electronic components thereon. Each of IC lands 18, on which the motor drive IC 43 for controlling the energization of a drive coil 17 to thereby rotate and drive the capstan shaft 41 is mounted, is disposed at a position adjoining the outer rotor 14 on this component mounting surface 44a. Further, the first wire land portion 45 is placed on the first corner part 48, while the second wire land portion 47 is placed on the opposite-side second corner part 49. Furthermore, the third wire land portion 46 is placed on the third corner part 50.

The first wire land portion 45 is a part for soldering the full flat cable 8 to the drum motor 2 used in the video cassette recorder. The second wire land portion 47 is a part for establishing electrical connection between the motor board and the circuit board provided at the side of the body of the video cassette recorder. The third wire land 46 is a part, to which the lead wires 9 connected to the loading motor 3 are soldered.

Figure 3A:
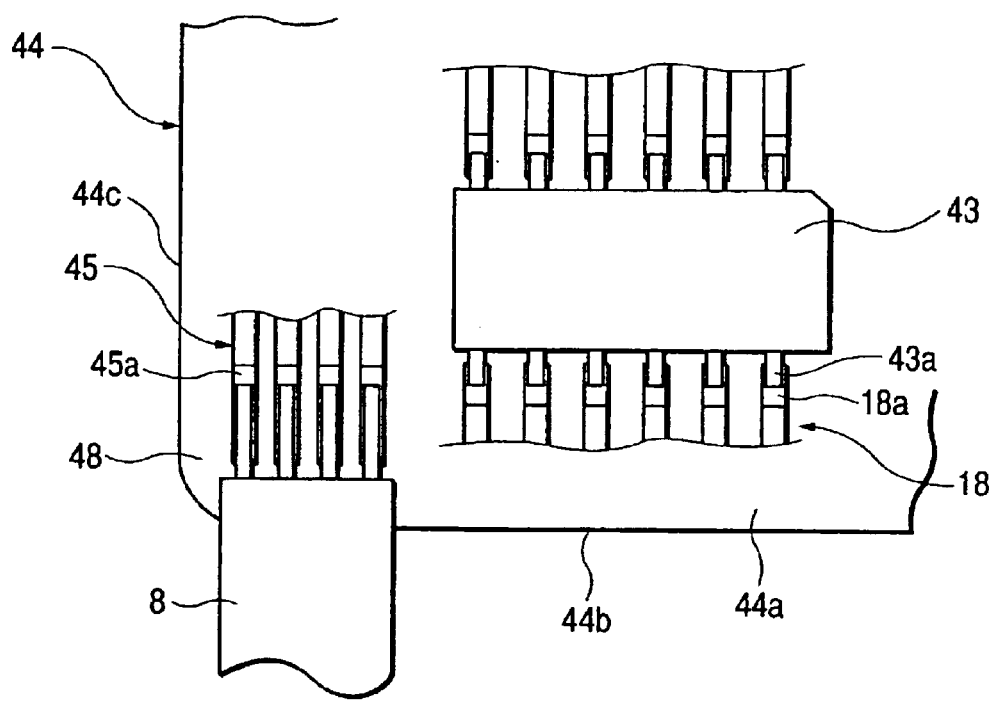
FIG. 3A is a partially enlarged view illustrating a part, on which IC lands and first wire land portion of the wiring lands are disposed, on a component mounting surface of a motor board shown in FIG. 1.

FIG. 3A is a partially enlarged view illustrating a part of the component mounting surface 44a of the motor board 44, on which the IC lands 18 and the first wire land portion 45 are disposed. As shown in this figure, on the component mounting surface 44a, the IC lands 18, which are a plurality of lands 18a formed in such a manner as to be soldered to lead terminals 43a of the motor drive IC 43, and the first wire land portion 45 that are a plurality of lands 45a, to which the full flat cable 8 is connected, are placed. As is seen from the figure, these IC lands 18 and the first wire land portion 45 is disposed in such a way as not to face each other. Moreover, both groups of the lands 18a and 45a are placed so that each of one of the groups of the lands 18a does not face the lands 45a of the other group, and that the lands 18a or 45a of one of both the groups are not placed on extensions of the lands 45a or 18a of the other group. Similarly, the second wire land portion 47 and the third wire land portion 46 are placed on the corner parts 49 and 50, respectively, in such a way as not to face the IC lands 18.

Thus, on the motor board 44 of the capstan motor 1 of this embodiment, the first wire land portion 45, to which the full flat cable 8 is soldered, are placed beside the IC lands 18, to which the motor drive IC 43 is soldered. Therefore, when the full flat cable 8 is soldered to the first wire land portion 45, unnecessary solder does not adhere to the lands 18a, which are the IC lands 18. Moreover, unnecessary solder is not bridged between the lands 45a of the first wire land portion 45, and the lands 18a of the IC lands 18. Consequently, the invention can prevent an occurrence of an unnecessary bridge.

Figure 3B:
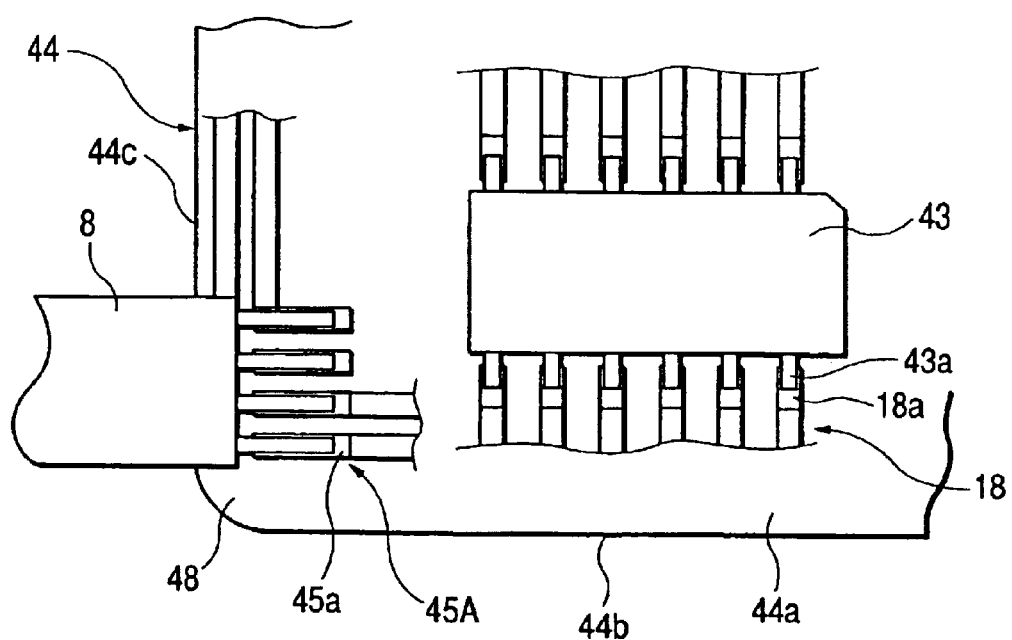
FIG. 3B is a partially enlarged view illustrating an example of placement of the first wire land portion shown in FIG. 3A.

In this embodiment, the first wire land portion 45 is arranged so that the flat cable 8 is drawn in a direction parallel to the side 44c and then soldered thereto. However, the first wire land portion 45 may be constructed so that the full flat cable 8 is drawn from a direction perpendicular to the direction, in which the flat cable 8 is drawn, and then soldered thereto. FIG. 3B is a partially enlarged view illustrating the motor board having another type of the first wire land portion 45A adapted so that the full flat cable 8 is drawn in such a manner and then soldered thereto. The motor board shown in this figure is the same as that shown in FIG. 3A except the direction in which the cable is drawn into the first wire land portion. Thus, in these figures, corresponding parts are designated by the same reference character.

Thus, the direction, in which the externally connected wire is drawn, can be freely selected by placing the wiring lands on the corner part of the motor board 44. Therefore, the flexibility in designing the layout of wiring to suitably draw the wire therearound is enhanced. Moreover, when a soldering jig for soldering the externally connected wire to the lands is manufactured, two sides 44b and 44c can be employed as reference sides. This facilitates the manufacturing of the jig.

Further, in the case that the motor drive IC 43 is one, into which the drive circuits for the drum motor 2 and the loading motor 3 are incorporated, similarly as this embodiment, the number of electronic components to be mounted on the motor board is increased by an increase in the number of the motors to be driven and controlled. However, in this embodiment, the wiring lands, to which the externally connected wires are connected, are disposed on the corner parts 48, 49, and 50 of the motor board 44, at which electronic components are hardly provided. Thus, a space, on which electronic components are mounted, can be ensured on the motor board 4.

In the aforementioned tape running apparatus 1, the drum motor 2 is connected to the motor board 44 through the full flat cable 8. Further, the loading motor 3 is connected to the motor board 44 through the lead wire 9. However, the motor board 44 can be connected to the two motors 2 and 3 by using a single full flat cable.

Figure 4:
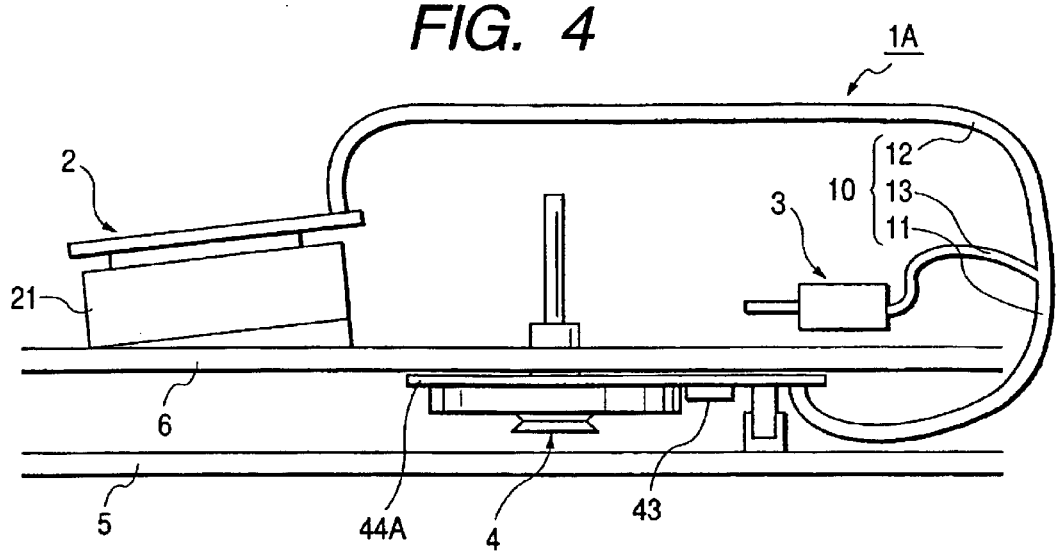
FIG. 4 is a side view illustrating another embodiment of the tape running apparatus shown in FIG. 1.
Figure 5:
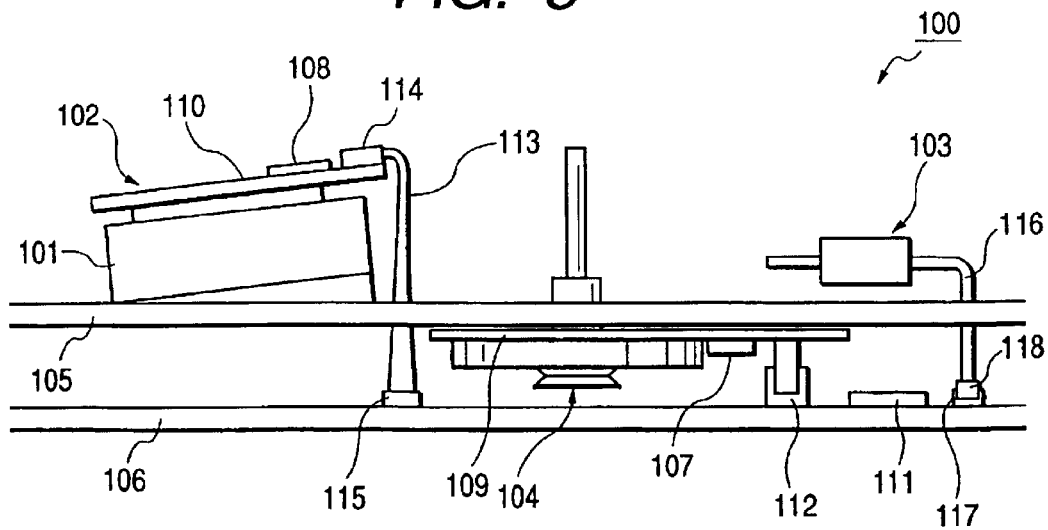
FIG. 5 is a partially side view illustrating a conventional tape running apparatus.

For instance, this is realized as follows. That is, as illustrated in FIG. 4, a full flat cable 10 having an end connected to the motor board 44A is branched at a halfway position on a board-side connection part 11 into two branch parts. An end portion of one of the two branch parts is drawn to the drum motor 2 and then connected thereto. An end portion of the other branch part is drawn to the loading motor 3 and then connected thereto.

Thus, the motor board 44A of the capstan motor is connected to each of the drum motor 2 and the loading motor 3 by a single junction cable.

As described above, in the tape running apparatus of the invention, the motor drive IC, into which the drive circuits for driving and controlling the drum motor, the loading motor, and the capstan motor are incorporated, is mounted on the motor board of the capstan motor, which faces the circuit board. The circuit board is connected to the motor board by using the inter-board connectors. Electrical connection is established between the circuit board and each of the drum motor and the loading motor through the motor board.

Therefore, according to the invention, electrical connection between the circuit board and each of the three motors can be established at low cost in a manner in which a necessary space is small. Thus, the invention is advantageous in reducing the cost and size of the apparatus.

Further, the motor drive IC is placed at a distance from the circuit board. Thus, the invention can prevent or restrain occurrences of adverse effects of motor noises, that is, prevent or restrain the motor noises from intruding the circuit-board-side circuit part and from adversely affecting picture signals and speech signals.

Further, the motor board of the capstan motor, on which the motor drive IC serving as a heating source for generating heat is mounted, is formed from the metallic material providing good heat dissipation. Thus, heat generated by the motor drive IC can be effectively radiated without employing countermeasures against heat radiation, such as additional provision of a heat sink.

What is claimed is:

1. A tape running apparatus including a circuit board, a drum motor, a loading motor and a capstan motor, comprising:
   a motor board of said capstan motor opposing to said circuit board; and
   a motor drive integrated circuit (IC) mounted on said motor board, said motor drive IC incorporating a drive circuit for said capstan motor, a drive circuit for said drum motor and a drive circuit for said loading motor thereinto;
   wherein said motor board having said motor drive IC relays electrical connections between said circuit board and said drum motor and said loading motor.

2. A tape running apparatus according to claim 1, further comprising:
   an inter-board connector for establishing an electrical connection between said motor board and said circuit board; and
   a junction wire for establishing the electrical connections between said motor board and two of said drum motor and said loading motor.

3. A tape running apparatus according to claim 2, wherein said junction wire comprises a junction cable including
   a circuit-board-side part connected to said circuit board; and
   branch parts branched from said circuit-board-side part and connected to said drum motor and said loading motor, respectively.

4. A tape running apparatus according to claim 1, wherein said motor board comprises a metallic board.

5. A surface mount motor board comprising:
   a plurality of integrated circuit (IC) lands mounted on a board surface of the motor board, to which lead terminals of a motor drive IC are directly soldered on a surface of the IC lands; and
   a plurality of wiring lands mounted on the board surface of the motor board, to which externally connected wires are directly soldered on a surface of the wiring lands,
   wherein said wiring lands are mounted at positions where said wiring lands do not oppose to said IC lands mounted on said board surface,
   wherein said board surface has a surface region defined by a first side, and second and third sides respectively extended from both ends of said first side in a direction differing from a direction along which said first side extends,
   wherein said wiring lands are disposed on a first corner part, which is defined by said first side and said second side, or a second corner part, which is defined by said first side and said third side, in this surface region,
   wherein said wiring lands include at least a first wire land portion and a second wire land portion,
   wherein said first wire land portion is disposed on one of said first and second corner parts while said second wire land portion is disposed on the other corner art
   wherein said motor board is configured for mounting a capstan motor of a tape running apparatus,
   wherein said first wire land portion is used for connecting said wire to a drum motor of said tape running apparatus, and
   wherein said first wire land portion is used for connecting said wire to a loading motor of said tape running apparatus.

6. A capstan motor comprising said motor board according to claim 5, further comprising
   a motor drive IC mounted on said motor board;
   wherein a drive circuit for driving said drum motor, and a drive circuit for driving said loading motor are incorporated into said motor drive IC.

* * * * *